United States Patent

Van De Velde et al.

[11] Patent Number: 6,045,926
[45] Date of Patent: Apr. 4, 2000

[54] THIN TEXTILE FABRIC COMPRISING BUNDLES OF METAL FILAMENTS

[75] Inventors: Philippe Van De Velde, Zwevegem; Wim Van Steenlandt, Sint-Niklaas, both of Belgium

[73] Assignee: N.V. Bekaert S.A., Belgium

[21] Appl. No.: 09/011,904

[22] PCT Filed: Aug. 22, 1996

[86] PCT No.: PCT/EP96/03695

§ 371 Date: Apr. 22, 1998

§ 102(e) Date: Apr. 22, 1998

[87] PCT Pub. No.: WO97/08108

PCT Pub. Date: Mar. 6, 1997

[30] Foreign Application Priority Data

Aug. 23, 1995 [BE] Belgium ................................. 9500705

[51] Int. Cl.⁷ ............................ B22D 11/00; B23K 20/04
[52] U.S. Cl. .......................... 428/606; 139/425 R; 442/3; 442/6; 442/229; 442/316; 428/605; 428/608; 428/611; 428/613
[58] Field of Search ..................................... 442/3, 6, 229, 442/316; 428/222, 605, 606, 608, 613, 611, 614; 139/425 R

[56] References Cited

U.S. PATENT DOCUMENTS 2,050,298  8/1936  Everett .
5,071,713  12/1991  Francois ................................. 428/606

FOREIGN PATENT DOCUMENTS 0 438 342  7/1991  European Pat. Off. .
0 477 785  4/1992  European Pat. Off. .
WO A 94 01372  1/1994  WIPO .

*Primary Examiner*—Terrel Morris
*Assistant Examiner*—Arti R. Singh
*Attorney, Agent, or Firm*—Nixon & Vanderhye P.C.

[57] ABSTRACT

The invention relates to a textile fabric comprising bundles of metal filaments obtained by bundled drawing whereby the bundles in the sheet consist of filaments running substantially parallel and whereby the fabric has a thickness of preferably less than 1 mm. The fabric is obtained by processing a number of drawn composite wires, in which the bundled metal filaments are embedded in a composite matrix, into a fabric by weaving, knitting or braiding and subsequently removing the composite matrix from the fabric. The fabric can also contain plain wires besides the metal filament bundles.

5 Claims, No Drawings

THIN TEXTILE FABRIC COMPRISING BUNDLES OF METAL FILAMENTS

BACKGROUND OF THE INVENTION

The invention relates to a thin woven, knitted or braided (knotted) textile fabric made from bundles of metal filaments. The fabric thus possesses successive meshes, mutually separated and delineated by these bundles. The invention also relates to a method for the manufacture of these sheets and the application thereof as a separation sheet for the shaping of glass plates in moulds.

Meshed metal fibre fabrics made from twisted filament or fibre bundles and having a thickness greater than 0.5 mm are known. The bundles must be twisted in order to enable them to be processed subsequently eg. on weaving, knitting or knotting machines without breaking.

If however, for the purpose of realising very thin sheets, very thin twisted bundles have to be used, it is difficult to avoid fibre breakages (during the weaving, knitting or braiding process), particularly on the outer surface of the bundles. The bundle surfaces thus attain a hairy appearance, making the surface of the fabric more or less rough.

It is also known, for example from WO 94/01372 from the applicant, to use meshed metal fibre sheets as separation sheets for the shaping of glass plates, such as vehicle windscreens, in moulds. In order to be able to realise an appropriate heat transfer during shaping, very thin sheets will preferably be used for certain types of windscreen. The high shaping temperature causes the glass surfaces to soften somewhat. The metal fibre separation sheets, which are located during shaping between the hard mould surface and the glass sheet, must however not impress their textile texture in, nor transfer it to the somewhat soft glass surface. In other words, the surface of the sheets must be relatively smooth (not hairy).

PURPOSE AND OBJECT OF THE INVENTION

The purpose of the invention is thus to obtain a thin meshed metal fibre fabric with smooth sheet surfaces.

The invention meets this requirement by providing a textile fabric with a thickness of less than 1 mm, e.g. between 100 and 500 $\mu$m, which contains bundles of metal filaments obtained by bundled drawing and whereby the mesh delineating bundles in the fabric consist of filaments running virtually parallel. The weight of the fabric will preferably lie between 200 and 400 g/m². If a woven or knitted fabric is envisaged with a smooth but simultaneously an even surface—and thus small meshes—the mesh openings will preferably be smaller than 1 mm².

The equivalent filament diameter of the bundle-drawn metal filaments, e.g. stainless steel filaments, lies between 1 and 25 $\mu$m, and preferably between 8 and 25 $\mu$m.

The invention also comprises a method for the manufacture of these textile fabrics. The substantially parallel arrangement of the filaments in the bundles is obtained according to the invention by processing a number of drawn composite wires, in which the bundled metal filaments are embedded in a composite matrix, into a fabric by weaving, knitting or braiding and by subsequently removing the composite matrix from the sheet, e.g. by etching, dissolving or melting it away. In order to realise the most uniform possible smoothness and/or permeability in the fabric, the sheet can subsequently be compacted by rolling or by isostatic pressing.

The invention relates in particular to the application of the fabric as described herein as a separation sheet for the shaping of glass plates in moulds. These moulds may contain a ring-shaped support as an aid for the shaping of glass plates. This support is then covered in an appropriate manner with a separation sheet according to the invention. The shaping surface itself of the mould can of course also be covered with the aforementioned separation sheet.

It is also an object of the invention to design hybrid textile fabrics comprising plain wires next to the metal fiber bundles, in at least one direction in the plane of the fabric. These plain wires have a thickness of preferably not more than 150 $\mu$m. The resulting fabric can thus be rigidified in a preferential direction since these interwoven plain wires, eg. metal wires, have generally a greater bending stiffness than the filament bundles. Obviously the composition of the plain wires must always be choosen so that it is not removed together with the matrix material in the composite wire.

The twisting together of plain wires (eg. stainless steel wires) with composite wires (containing stainless steel filaments) before interweaving is likewise feasible. After processing into a fabric and removing the composition matrix, the remaining fabric then contains plain wires closely combined (sheathed) with a bundle of metal fibers.

Instead of interweaving single composite wires it is also possible to first twist together at least two composite wires.

These twisted composite structures can then be processed into fabrics in at; least one direction.

To improve the extensibility of the fabric in at least one direction, the composite wires in that direction may be crimped before processing into fabrics. A crimping process for the composite wires is disclosed in EP 0280340 of applicant.

DETAILED DESCRIPTION OF THE INVENTION

All these aspects will now be illustrated on the basis of an embodiment in the form of a separation sheet and as an example. Additional features and advantages will be explained thereby. By analogy with the procedure of bundled drawing as described in U.S. Pat. No. 2,050,298, a bundle of 50 to 90 stainless steel wires is embedded in a matrix material and enclosed in a tubular steel casing. The cross-section of the tube may be circular or oval. This composite is reduced by wire drawing to the desired diameter until the 50 to 90 filaments have an equivalent diameter of between 8 and 25 $\mu$m (e.g. 12 or 14 $\mu$m for 90 filaments). The composite wires obtained are then woven using e.g. a satin 5 binding to form a sheet with a mass of between 250 and 700 g/m² (ISO 3801), and preferably between 250 and 450 g/m². The density of the warp and weft thereby lies between 1400 and 1550 wires per m (DIN 53853). The thickness of the sheet thus lies between 250 and 800 $\mu$m (NBN G55-002), and preferably between 250 and 520 $\mu$m.

Processing the composite wires into a fabric, e.g. by weaving, warp or weft knitting or braiding offers the advantage that the filaments are protected in their encasement and matrix against the danger of breakage as a result of mechanical interactions (including friction) in the processing machines. If required the composite wires may be twisted (about their axis) for the purpose of processing into a fabric. In this way the filament bundle is slightly twisted; the filaments however remain arranged substantially parallel within the bundles. Subsequently the fabric obtained from composite wires is placed in an acid solution where the encasement and the matrix material are etched away from the bundles so that a fabric consisting of bare filament bundles remains.

This method enables that the chance of errors or irregularities during the processing operation to form the fabric, and thus in the ultimate fabric itself, has become extremely small since a load is exerted only on the composite during the processing to form a fabric and not on the individual filaments. The chance that broken filaments (and thus hairiness) will occur in the fabric has thus become extremely small since during processing the composite absorbs the forces and distributes them proportionally over all filaments, the matrix and the encasement. This method also permits sheets to be manufactured from thinner bundles (fewer and/or thinner filaments) than has been possible to date. After removal of the matrix, therefore, a sheet remains with a controllable thickness, smoothness, compressibility and flexibility. Moreover by adjusting the degree of torsion in the composite wires, these parameters can be adjusted. The weaving or knitting density can be adjusted as well.

Since the filaments moreover are relatively loosely arranged in the bundles, the thickness of the fabric can be further reduced permanently (plastically) by rolling or isostatic pressing to thicknesses of 100 $\mu$m and even lower. This rolling or pressing also generally promotes the evenness of the surface.

EXAMPLES

The thin woven fabric described above with satin binding 5 made from non-twisted bundles, comprising 90 filaments each with an equivalent cross-section of 12 $\mu$m, a sheet mass of 300 g/m$^2$ and a fabric thickness (before etching) of 300 $\mu$m can be used as a separation sheet in shaping processes for glass plates, e.g. vehicle windscreens in moulds. By means of rolling, the fabric can be further reduced to a thickness of approximately 150 $\mu$m. Moreover, it acquires a pronounced smooth and even surface due to the rolling. The ring-shaped support for the glass plates to be shaped (maximum plate thickness approximately 2 mm) can be covered with this fabric as a separation sheet. Because of its smooth surface the glass plate can slide over the sheet during the shaping process without markings being left during the tempering of the plates. The low mass of the sheet also permits the appropriate heat transfer characteristics to be realised for the windscreens. If desired the ring-shaped support may also be covered with open-meshed thin separation sheets in accordance with the invention manufactured using warp knitting (e.g. on Rachel machines).

Naturally, the surface of the male element of the mould can also be covered with the uniform, even or smooth and thin separation sheet in accordance with the invention.

Flat-knitted sheets made from composite wires with different zones in their surface or throughout their cross-section, with mutually differing knitting patterns, can if desired be used in accordance with the teachings in WO 94/01372. After knitting the matrix material is removed from the composite wires.

The thin, extremely flexible fabrics and those comprising plain wires or twisted composite structures can also be coated or united with other materials in powder, fibre, liquid, paste, foil or plate form with a view to their application in other fields, e.g. for obtaining antistatic properties in objects to be covered or in order to provide them with a capacity of shielding against electromagnetic waves.

The invention also now makes it possible for the first time to manufacture meshed textile structures from thin metal filaments, that is to say with an equivalent diameter of approximately 6.5 $\mu$m and with a relatively small number of filaments in each composite bundle to be processed, e.g. no higher than 50. Moreover a composite bundle can be processed to form a fabric if it contains e.g. approximately 1000 filaments each having an equivalent cross-section of approximately 1 $\mu$m. Naturally it is also possible, using certain cross-sectional diameters of the filaments, to calculate all kinds of intermediate combinations of filament numbers in the bundle in order to achieve a composite bundle with a diameter greater than e.g. 50 $\mu$m.

We claim:

1. A method of avoiding a hairy appearance with textile fabrics, which comprises the steps of:
   (a) bundling metal wires in a composite matrix;
   (b) drawing said bundled metal wires into a bundle of metal filaments;
   (c) processing said bundle of metal filaments to form a fabric; and thereafter
   (d) removing said composite matrix from said fabric.

2. A method according to claim 1, wherein step (c) is practiced by forming said bundle of metal filaments into a fabric by weaving, knitting or braiding.

3. A method according to claim 1, wherein said method further comprises (e) compacting said fabric by means of rolling or by means of isostatic pressing.

4. A method according to claim 3 wherein said compacting is done until said fabric has a thickness less than 1.0 mm.

5. A method according to claim 1, wherein plain wires are added during processing of said bundle of metal filaments to form a fabric.

* * * * *